(12) United States Patent
Matsunami

(10) Patent No.: US 9,096,102 B2
(45) Date of Patent: Aug. 4, 2015

(54) TWO-WHEELED AUTOMOTIVE VEHICLE TIRE

(75) Inventor: Toshiyuki Matsunami, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 101 days.

(21) Appl. No.: 13/458,230

(22) Filed: Apr. 27, 2012

(65) Prior Publication Data

US 2013/0008580 A1    Jan. 10, 2013

(30) Foreign Application Priority Data

Jul. 8, 2011    (JP) .................................. 2011-151708

(51) Int. Cl.
    B60C 15/06    (2006.01)
    B60C 9/22     (2006.01)
    B60C 15/00    (2006.01)

(52) U.S. Cl.
    CPC ........... *B60C 15/0603* (2013.04); *B60C 9/2204* (2013.04); *B60C 15/0018* (2013.04); *B60C 15/0036* (2013.04); *B60C 2015/009* (2013.04); *B60C 2015/061* (2013.04); *B60C 2200/10* (2013.04)

(58) Field of Classification Search
    CPC .... B60C 2200/10; B60C 9/2204; B60C 9/08; B60C 15/0018; B60C 15/0036; B60C 15/009; B60C 15/0603; B60C 15/0054; B60C 15/0063; B60C 2015/061; B60C 2015/009
    USPC .......... 152/541, 546, 539, 531, 554, 550, 548
    IPC ..................................................... B60C 15/06
    See application file for complete search history.

(56) References Cited

U.S. PATENT DOCUMENTS

| 4,947,917 A * | 8/1990 | Noma et al. ................... 152/536 |
| 5,429,169 A * | 7/1995 | Igarashi et al. ............... 152/454 |
| 2007/0102089 A1 | 5/2007 | Matsunaga |
| 2011/0308688 A1 | 12/2011 | Bestgen et al. |

FOREIGN PATENT DOCUMENTS

| EP | 1 342 592 A2 | 9/2003 |
| EP | 1 785 286 A1 | 5/2007 |
| EP | 2 196 328 A1 | 6/2010 |
| FR | 2 924 978 A1 | 6/2009 |
| JP | 04-321403 A | 11/1992 |
| JP | 05-246209 A | 9/1993 |
| JP | 08-000485 * | 1/1996 ............... B60C 9/08 |
| JP | 10-175410 A | 6/1998 |
| JP | 2007-131139 A | 5/2007 |

* cited by examiner

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A band 12 of a tire 2 includes a topping rubber, and a cord that is helically wound in a circumferential direction of the tire 2. A carcass 10 includes a first carcass ply 22, and a second carcass ply 24 that is layered over the first carcass ply 22, so as to be located outwardly of the first carcass ply 22 in the radial direction. The first carcass ply 22 is turned up around beads 8. The turnup ends 36 are located inwardly of the second carcass ply 24 in an axial direction. A tip of an apex is located inwardly, in the radial direction, of the end of the tread, and outwardly, in the radial direction, of a position that is distant from the end of the tread in the radially inward direction by one-third of a length of the straight line LH.

2 Claims, 2 Drawing Sheets

TWO-WHEELED AUTOMOTIVE VEHICLE TIRE

This application claims priority on Patent Application No. 2011-151708 filed in JAPAN on Jul. 8, 2011. The entire contents of this Japanese Patent Application are hereby incorporated by reference.

BACKGROUND OF THE INVENTION

1. Field of the Invention

The present invention relates to pneumatic tires for use in two-wheeled automotive vehicles.

2. Description of the Related Art

Construction and maintenance of expressway networks have been enhanced, so that two-wheeled automotive vehicles are caused to run at a high speed for a long time period. Performance of two-wheeled automotive vehicles has been remarkably improved. The improvement in performance of the vehicles leads to improvement of tire limit performance.

As two-wheeled automotive vehicle tires, radial tires are used. An example of such radial tires is disclosed in JP2007-131139 (US2007/0102089). The tire is for use in two-wheeled automotive vehicles, and enables improvement of cornering stability without deteriorating ride comfort. In this tire, a carcass includes a first carcass ply and a second carcass ply. The first carcass ply is wound around bead cores, and is turned up outward. The second carcass ply covers end portions of the first carcass ply having been turned up.

Vehicle performance of the two-wheeled automotive vehicles is improving on a daily basis. The improvement of the vehicle performance requires increased improvement of limit performance of tires that enable excellent ride comfort and excellent cornering performance to be both realized.

An object of the present invention is to make available a pneumatic tire, for use in a two-wheeled automotive vehicle, which enables increased improvement of cornering stability with improvement of ride comfort.

SUMMARY OF THE INVENTION

A pneumatic tire, for use in a two-wheeled automotive vehicle, according to the present invention includes: a tread; a pair of sidewalls extending approximately inward from ends, respectively, of the tread in a radial direction; a pair of beads extending approximately inward from the pair of sidewalls, respectively, in the radial direction; a carcass extending on and between the beads under and along the tread and the pair of sidewalls; and a band located inwardly of the tread in the radial direction and layered over the carcass under the tread. The band includes a cord and a topping rubber. The cord is helically wound in a tire circumferential direction. An absolute value of an angle of the cord to an equator plane is less than or equal to five degrees. The carcass includes a first carcass ply, and a second carcass ply that is layered over the first carcass ply, so as to be located outwardly of the first carcass ply in the radial direction. The first carcass ply includes a first carcass cord and a topping rubber, and an absolute value of a tilt angle of the first carcass cord relative to the tire circumferential direction is greater than or equal to 60 degrees, and is not greater than 90 degrees. The second carcass ply includes a second carcass cord and a topping rubber, and an absolute value of a tilt angle of the second carcass cord relative to the tire circumferential direction is greater than or equal to 60 degrees, and is not greater than 90 degrees. The first carcass ply is turned up around the pair of beads. The first carcass ply includes turned-up portions extending approximately outward in the radial direction, and turnup ends located at radially outermost ends of the turned-up portions, respectively. The second carcass ply includes inner ends at radially innermost ends thereof. The turnup ends are located inwardly of the second carcass ply in an axial direction.

A point that is on a tread surface, and is distant from a corresponding one of the ends of the tread by a quarter of a half width LT of a width of the tread surface in the axial direction, is represented as a point PA. A midpoint of a straight line LH connecting between the one of the ends of the tread, and a heel of a corresponding one of the beads, is represented as a point PB. A point, on a tire outer surface, corresponding to a corresponding one of the turnup ends is represented as a point P1. A point, on the tire outer surface, corresponding to a corresponding one of the inner ends is represented as a point P2. When the points PA, PB, P1, and P2 are defined as described above, the point P1 is located inwardly of the point PA in the radial direction, the point P2 is located outwardly of the point PB in the radial direction, and a tip of an apex is located inwardly, in the radial direction, of a corresponding one of the ends of the tread, and outwardly, in the radial direction, of a position that is distant from the one of the ends of the tread in the radially inward direction by one-third of a length of the straight line LH.

Preferably, a ratio AW/BW of a thickness AW of the apex at the point PB relative to a width BW of each bead, is greater than or equal to 0.3, and is not greater than 0.7. Preferably, a hardness of a crosslinked rubber of the apex is greater than or equal to 70, and is not greater than 85.

In the tire, a stiffness of the tire is enhanced due to a synergistic effect of the carcass and apexes. The tire enables generation of sufficient cornering force. In corner driving, torsion is restrained from being generated in the tire. The tire is excellent in cornering stability. On the other hand, the tire enables deterioration of ride comfort to be restrained.

DESCRIPTION OF THE PREFERRED EMBODIMENTS

The following will describe in detail the present invention based on preferred embodiments with reference to the accompanying drawing.

Figure 1:
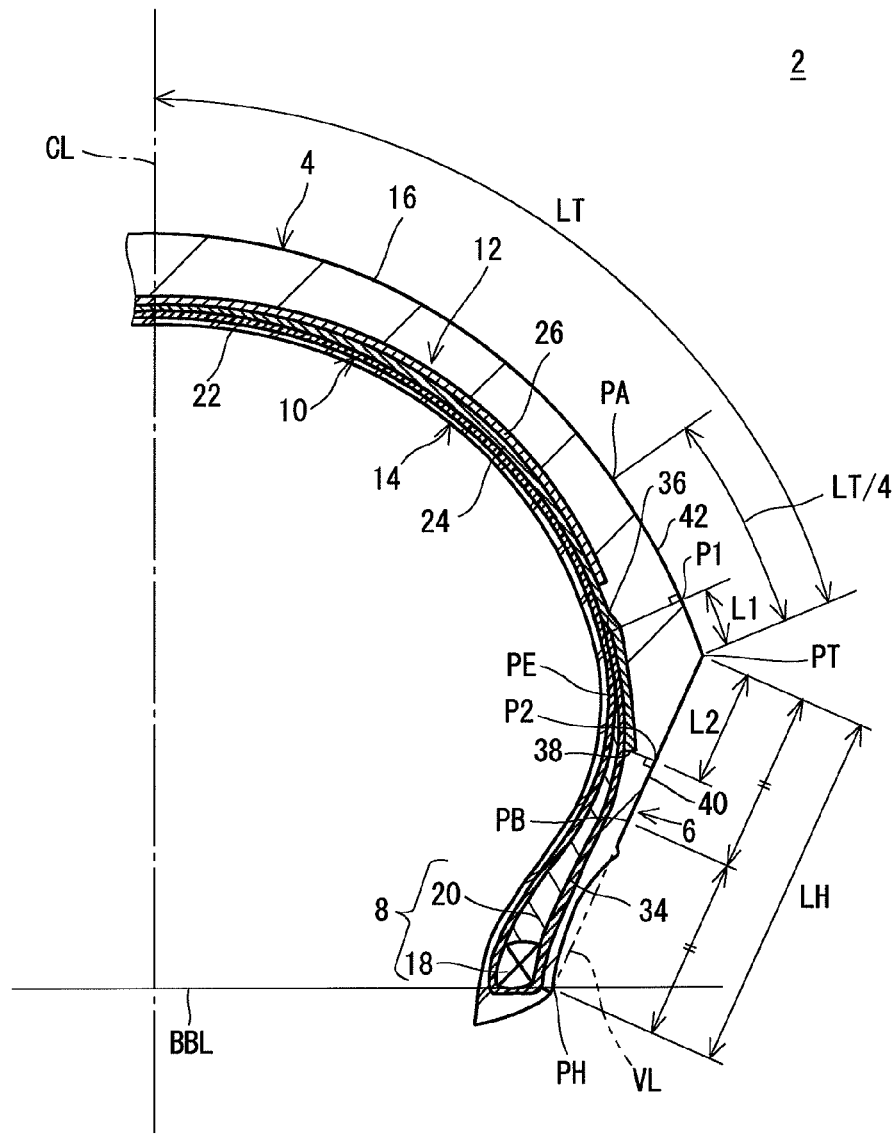
FIG. 1 is a cross-sectional view of a portion of a two-wheeled automotive vehicle tire according to an embodiment of the present invention.

FIG. 1 is a cross-sectional view of a portion of a two-wheeled automotive vehicle tire 2 according to an embodiment of the present invention. In FIG. 1, the upward/downward direction represents the radial direction of the tire 2, the leftward/rightward direction represents the axial direction of the tire 2, and the direction orthogonal to the surface of the sheet represents the circumferential direction of the tire 2. The tire 2 has a shape which is almost bilaterally symmetric about an alternate long and short dash line CL shown in FIG. 1. The alternate long and short dash line CL represents the equator plane of the tire 2. The tire 2 includes a tread 4, sidewalls 6, beads 8, a carcass 10, a band 12, and an inner liner 14. The tire 2 is a tubeless pneumatic tire.

The tread 4 is formed of a crosslinked rubber. The tread 4 has a shape projecting outward in the radial direction. The tread 4 forms a tread surface 16 that can contact with a road surface. Grooves may be formed in the tread surface 16, to form a tread pattern, which is not shown.

The sidewalls 6 extend approximately inward in the radial direction from the ends, respectively, of the tread 4. The sidewalls 6 are formed of a crosslinked rubber. The sidewalls 6 absorb impact from a road surface due to their flexure. The sidewalls 6 prevent injury of the carcass 10.

The beads 8 extend approximately inward from the sidewalls 6, respectively, in the radial direction. Each bead 8 includes a core 18, and an apex 20 extending from the core 18 outward in the radial direction. The core 18 is formed such that a non-stretchable wire is wound so as to be ring-shaped. A steel wire is typically used for the core 18. The apex 20 is tapered outward in the radial direction. The apex 20 is formed of a highly hard crosslinked rubber.

In FIG. 1, a solid line BBL represents a bead base line. The bead base line BBL is a line that defines a diameter of a rim to which the tire 2 is mounted (see JATMA). The bead base line BBL extends in the axial direction. A point PH is a point of intersection between the bead base line BBL, and an outer side surface of each bead 8 in the axial direction. The point PH represents a heel of each bead 8.

The carcass 10 extends on and between the beads 8 located on both sides. The carcass 10 extends under and along the tread 4 and the sidewalls 6. The carcass 10 includes a first carcass ply 22 and a second carcass ply 24. The first carcass ply 22 is turned up around each bead 8 from the inner side toward the outer side in the axial direction. The second carcass ply 24 is layered over the first carcass ply 22, so as to be located outwardly of the first carcass ply 22 in the radial direction.

The first carcass ply 22 includes a first carcass cord and a topping rubber, which is not shown. The first carcass cord is tilted relative to the equator plane. An absolute value of the tilt angle relative to the equator plane is greater than or equal to 60 degrees, and is not greater than 90 degrees. The second carcass ply 24 includes a second carcass cord and a topping rubber. The second carcass cord is tilted relative to the equator plane. An absolute value of the tilt angle relative to the equator plane is greater than or equal to 60 degrees, and is not greater than 90 degrees. In other words, the tire 2 is a radial tire. In the tire 2, a direction in which the first carcass cord tilts relative to the equator plane is opposite to a direction in which the second carcass cord tilts relative to the equator plane. The absolute value of the tilt angle of the first carcass cord is set to be equal to the absolute value of the tilt angle of the second carcass cord. Each of the first carcass cord and the second carcass cord is typically formed of an organic fiber. Examples of preferable organic fiber include polyester fibers, nylon fibers, rayon fibers, polyethylene naphthalate fibers, and aramid fibers.

The tire 2 may include a belt, which is not shown. The belt is located outwardly of the carcass 10 in the radial direction. The belt is layered over the carcass 10. The belt reinforces the carcass 10. The belt includes, for example, an inner layer and an outer layer. Each of the inner layer and the outer layer includes a topping rubber, and multiple cords aligned with each other. Each cord is tilted relative to the equator plane. An absolute value of the tilt angle is greater than or equal to 10 degrees, and is not greater than 35 degrees. A direction in which the cords of the inner layer tilt is opposite to a direction in which the cords of the outer layer tilt. For the cords, cords formed of an organic fiber are preferably used. A steel may be used for the cords.

The band 12 is layered over the carcass 10 so as to be located outwardly of the carcass 10 in the radial direction. When the tire is structured to have the belt described above, the band 12 is, for example, layered over the belt, so as to be located outwardly of the belt in the radial direction. The band 12 includes a cord and a topping rubber, which is not shown. The cord extends substantially in the circumferential direction, and is helically wound. The band 12 has a so-called jointless structure. The cord binds the tire 2 in the radial direction. When the tire is structured to have The belt, lifting of the belt is restrained. The cord is typically formed of an organic fiber. Examples of preferable organic fiber include nylon fibers, polyester fibers, rayon fibers, polyethylene naphthalate fibers, and aramid fibers.

The inner liner 14 is bonded to the inner circumferential surface of the carcass 10. The inner liner 14 is formed of a crosslinked rubber. For the inner liner 14, a rubber that is low in air permeability is used. The inner liner 14 functions to maintain an internal pressure of the tire 2.

As shown in FIG. 1, the first carcass ply 22 is turned up around each bead 8 from the inner side toward the outer side in the axial direction, and extends approximately outward in the radial direction. The first carcass ply 22 includes turned-up portions 34 that extend approximately outward in the radial direction. Each turned-up portion 34 has a turnup end 36 at an outermost end thereof in the radial direction.

The second carcass ply 24 is not turned up around each bead 8. The second carcass ply 24 includes inner ends 38. The inner ends 38 are each an innermost portion of the second carcass ply 24 in the radial direction. The turnup ends 36 of the first carcass ply 22 are located outwardly of the inner ends 38, respectively, in the radial direction. The turnup ends 36 are covered by the second carcass ply 24.

In FIG. 1, a double-headed arrow line LT represents a half width of the tread surface 16 in the axial direction. A point PT represents a tread end. The half width LT represents a width from the equator plane CL to the point PT of the tread end. The half width LT is measured along the tread surface 16. A point PA represents a position that is on the tread surface 16, and is distant from the point PT of the tread end by a quarter of the half width LT. The point PA is obtained on the cross-section of the tire 2 having been cut as shown in FIG. 1.

An alternate long and two short dashes line VL represents a straight line connecting between the point PH, and the point PT of the tread end. A point PB represents a midpoint of the straight line VL. In the tire 2, the point PB is on an outer surface 40 of each sidewall 6. The point PB is obtained on the cross-section of the tire 2 having been cut as shown in FIG. 1. When the midpoint of the straight line VL is not on the outer surface 40 of each sidewall 6, a point of intersection between the outer surface 40 of each sidewall 6, and a straight line that connects, by a minimal distance, between the midpoint of the straight line VL, and the outer surface 40 of the sidewall 6, is used as the point PB.

In FIG. 1, a point P1 represents a position on an outer surface 42 of the tire 2. The point P1 is a point corresponding to the turnup end 36. The point P1 represents a point of intersection between the outer surface 42, and a straight line that connects, by a minimal distance, between the turnup end 36 and the outer surface 42. A point P2 represents a position on the outer surface 40 of the tire 2. The point P2 is a point corresponding to each inner end 38. The point P2 represents a point of intersection between the outer surface 40, and a straight line that connects, by a minimal distance, between the inner end 38 and the outer surface 40. A range from the point P1 to the point P2 corresponds to a range in which each turned-up portion 34 and the second carcass ply 24 are layered over each other. The point P1 and the point P2 are obtained on the cross-section of the tire 2 having been cut as shown in FIG. 1.

In the tire 2, the point P1 is located inwardly of the point PA in the radial direction, and is located outwardly of the point PT of the tread end in the radial direction. In the tire 2, the outer surface 42 forms a part of the tread surface 16. The point P2 is located outwardly of the point PB in the radial direction, and is located inwardly of the point PT of the tread end in the radial direction. In the tire 2, the outer surface 40 forms a part of the outer side surface of each sidewall 6 in the axial direction. In the tire 2, a range in which each turned-up portion 34 and the second carcass ply 24 are layered over each other is defined so as to be within a range from the point PA to the point PB.

In FIG. 1, a double-headed arrow line L1 represents a length from the point PT of the tread end to the point P1. The length L1 is measured along the tread surface 16. A double-headed arrow line L2 represents a length from the point PT of the tread end to the point P2. A double-headed arrow line LH represents a length from the point PT of the tread end to the point PH of the heel. The length L2 and the length LH are measured along the straight line VL. The length L1, the length L2, and the length LH are obtained on the cross-section of the tire 2 having been cut as shown in FIG. 1.

In the tire 2, since the second carcass ply 24 covers each turnup end 36 of the first carcass ply 22, the carcass 10 is reinforced by the turned-up portions 34. The stiffness of the carcass 10 is appropriately enhanced. In corner driving, occurrence of torsion is restrained. Further, since the point P1 is located outwardly of the point PT of the tread end in the radial direction, a stiffness is enhanced near the tread 4. The tire 2 is excellent in cornering stability. In this viewpoint, a ratio L1/LT of the length L1 to the half width LT is preferably greater than or equal to 0.05. The ratio L1/LT is more preferably greater than or equal to 0.07, and is particularly preferably greater than or equal to 0.10.

On the other hand, since the point P1 is located inwardly of the point PA in the radial direction, deterioration of shock absorbency of the tire 2 is restrained. Thus, the tire 2 is excellent in ride comfort. In this viewpoint, the ratio L1/LT is not greater than 0.25. The ratio L1/LT is preferably not greater than 0.20. The ratio L1/LT is more preferably not greater than 0.18, and is particularly preferably not greater than 0.15.

In the tire 2, since the point P2 is located inwardly of the point PT of the tread end in the radial direction, a stiffness is enhanced near the tread 4. In this viewpoint, a ratio L2/LH of the length L2 to the length LH is preferably greater than or equal to 0.10. The tire 2 is excellent in cornering stability. In this viewpoint, the ratio L2/LH is more preferably greater than or equal to 0.15, and is particularly preferably greater than or equal to 0.20.

On the other hand, the point P2 is located outwardly of the point PB in the radial direction, and the ratio L2/LH is set to be not greater than 0.50. Thus, deterioration of shock absorbency is restrained. The tire 2 is excellent in ride comfort. In this viewpoint, the ratio L2/LH is preferably not greater than 0.40. The ratio L2/LH is more preferably not greater than 0.35, and is particularly preferably not greater than 0.30.

Further, a tip PE of the apex 20 is located inwardly of the tread end PT in the radial direction, and outwardly, in the radial direction, of a position that is distant from the tread end PT in the radially inward direction by one-third of the length LH. A stiffness of the tire 2 is enhanced due to a synergistic effect of the carcass 10 and the apex 20. The tire 2 is excellent in cornering stability. On the other hand, the tip of the apex 20 is located inwardly of the tread end PT in the radial direction.

Thus, a stiffness of the tire 2 is restrained from being excessively enhanced. The tire 2 is excellent in ride comfort.

In the tire 2, since the tip PE of the apex 20 is located inwardly of the tread end PT in the radial direction, and outwardly, in the radial direction, of a position that is distant from the tread end PT in the radially inward direction by one-third of the length LH, a difference in stiffness between the radially outer side of the tire 2 and the radially inner side of the tire 2 is restrained from being increased. In a tire in which a difference in stiffness between the radially outer side and the radially inner side is great, when a great external force is applied, the external force cannot be sufficiently absorbed in a portion having a low stiffness. When a great external force is applied, the ride comfort is significantly deteriorated. In the tire 2, even when a great external force is applied, significant deterioration of ride comfort is restrained.

Figure 2:
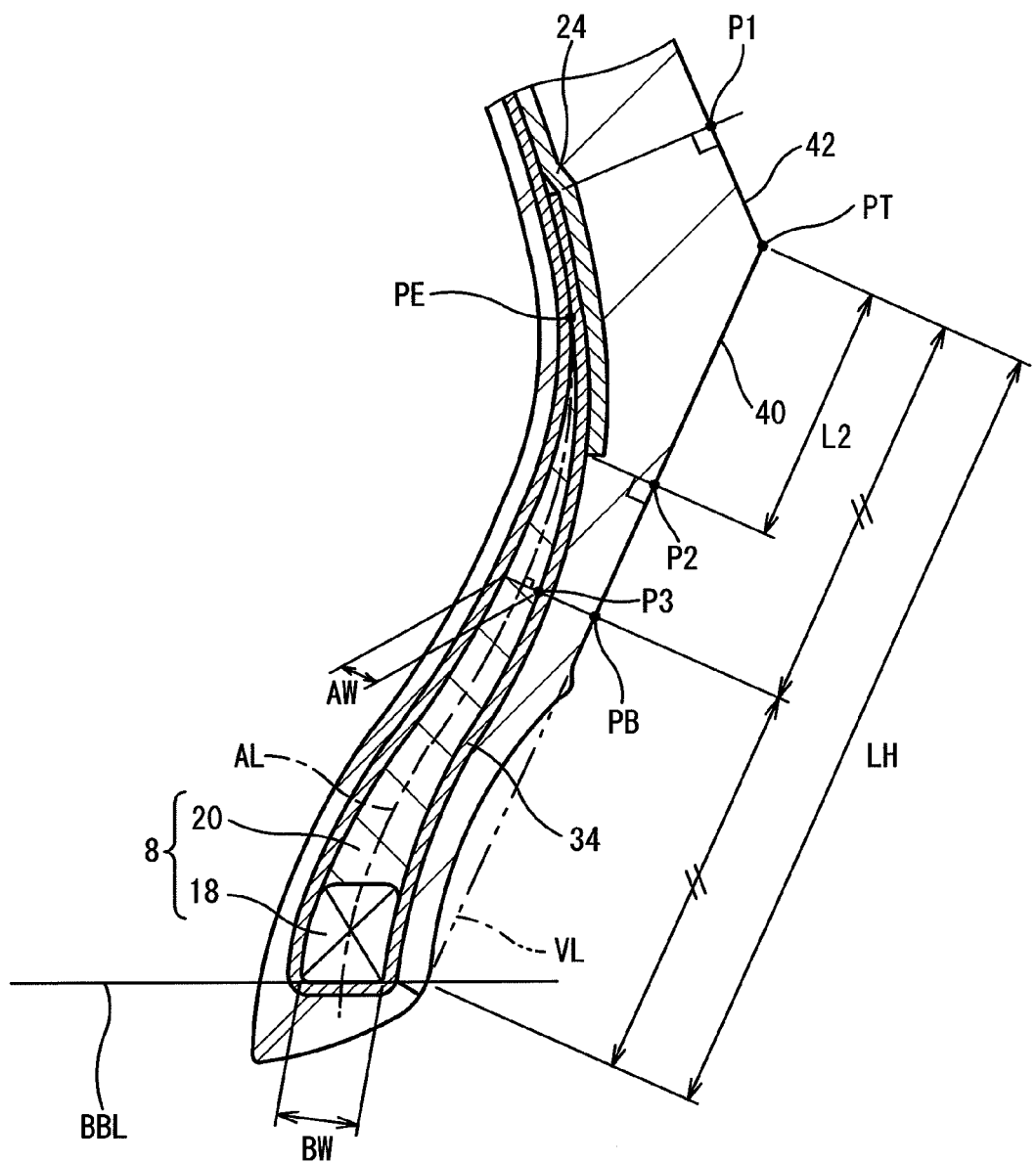
FIG. 2 is an enlarged cross-sectional view of a portion of the tire shown in FIG. 1.

A point P3 shown in FIG. 2 represents a point of intersection between the axially outer side surface of the apex 20, and a straight line that passes through the point PB, and that is orthogonal to the straight line VL. An alternate long and short dash line AL represents the center line of the apex 20. A double-headed arrow line AW represents a thickness of the apex 20 obtained at the point P3. The thickness AW is measured in a direction orthogonal to the center line AL. A double-headed arrow line BW represents a width of each bead 8. The width BW is a maximal width of the bead 8. In general, the width of the bead 8 is maximal at a position of the core 18, or at a position near the core 18. The width BW is measured at a position at which the width of the bead 8 is maximal. In general, the width BW is greater than or equal to 4.0 mm, and is not greater than 7.5 mm.

In the tire 2, the thickness AW of the apex 20 relative to the width BW of the bead 8 is set to be sufficiently great, and, when this feature is combined with the structure of the carcass 10 as described above, a sufficient stiffness can be obtained. The tire 2 is excellent in cornering stability. In this viewpoint, a ratio AW/BW of the thickness AW to the width BW is set to be greater than or equal to 0.30. The ratio AW/BW is more preferably greater than or equal to 0.35, and is particularly preferably greater than or equal to 0.40.

On the other hand, when the thickness AW is reduced relative to the width BW, the tire 2 becomes excellent in shock absorbency. The tire 2 is excellent in ride comfort. In this viewpoint, the ratio AW/BW is set to be not greater than 0.70. The ratio AW/BW is more preferably not greater than 0.65, and is particularly preferably not greater than 0.60.

Further, when a hardness of the crosslinked rubber of the apex 20 is set within a predetermined range, the tire 2 excellent in ride comfort and cornering stability can be obtained. The tire 2 in which the hardness of the crosslinked rubber of the apex 20 is high enables sufficient stiffness to be obtained. In this viewpoint, the hardness is preferably greater than or equal to 70. The hardness is more preferably greater than or equal to 73, and is particularly preferably greater than or equal to 75. On the other hand, the tire 2 in which the hardness of the crosslinked rubber of the apex 20 is low is excellent in ride comfort. In this viewpoint, the hardness is preferably not greater than 85. The hardness is more preferably not greater than 82, and is particularly preferably not greater than 80.

The dimensions and angles for the tire 2 are measured in a state where the tire 2 is incorporated in a normal rim, and the tire 2 is filled with air so as to obtain a normal internal pressure, unless otherwise specified. During the measurement, no load is applied to the tire 2. In the description of the present invention, the normal rim represents a rim which is specified according to the standard with which the tire 2 complies. The "standard rim" in the JATMA standard, the "Design Rim" in the TRA standard, and the "Measuring Rim" in the ETRTO standard are included in the normal rim. In the description of the present invention, the normal internal pressure represents an internal pressure which is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure. In the present invention, the rubber hardness is measured at 23° C. in compliance with the standard of "JIS-K 6253" by a type A durometer being pressed against the tire 2.

EXAMPLES

Hereinafter, effects of the present invention will become apparent according to examples. However, the present invention should not be restrictively construed based on the description of examples.

Example 1

A two-wheeled automotive vehicle tire of example 1 having a fundamental structure shown in FIG. 1, and specifications indicated below in table 1, was obtained. The size of the tire was 120/70ZR17. A material of a band cord was a steel. An angle of the band cord to the equator plane was substantially zero degrees. A carcass of the tire included a first carcass ply and a second carcass ply. A first carcass cord of the first carcass ply, and a second carcass cord of the second carcass ply were each formed of a nylon fiber. An angle of each of the first carcass cord and the second carcass cord relative to the equator plane was substantially 90 degrees. The angle of the first carcass cord to the equator plane was equal to the angle of the second carcass cord to the equator plane. A fineness of each of the first carcass cord and the second carcass cord was 2/1840 dtex. The first carcass ply was turned up around beads from the inner side toward the outer side in the axial direction. The second carcass ply was not turned up around each bead. Turnup ends of the first carcass ply were located inwardly of the second carcass ply in the axial direction. A ratio L1/LT of the length L1 from the tread end PT to the point P1 corresponding to a position of the turnup end, relative to the half width LT of the tread surface 16, was 0.10. A ratio L2/LH of the length L2 from the point PT of the tread end to the point P2 corresponding to a position of an inner end of the second carcass ply, relative to the length LH from the tread end PT to the point PH of the heel, was 0.40.

In table 1, "first carcass ply turnup position" indicates whether each turnup end of the first carcass ply was located inwardly or outwardly of the second carcass ply in the axial direction. A structure in which each turnup end was located inwardly thereof is represented as A, and a structure in which each turnup end was located outwardly thereof is represented as B. Further, as "apex tip position", A indicates a structure in which the tip of the apex was located inwardly, in the radial direction, of the point PT of the tread end, and outwardly, in the radial direction, of a position that is distant from the point PT of the tread end in the radially inward direction by 1/3LH, B indicates a structure in which the tip of the apex was located inwardly, in the radial direction, of the position that is distant from the point PT of the tread end in the radially inward direction by 1/3LH, and C indicates a structure in which the tip of the apex was located outwardly of the point PT of the tread end in the radial direction. In "first carcass ply turnup position" and "apex tip position" of table 2 and table 3, contents are indicated in the same manner as in table 1.

Comparative Example 1

A tire was obtained in the same manner as in example 1 except that a second carcass ply was also turned up around beads, and a tip position of each apex and a ratio AW/BW were as indicated below in table 1.

Comparative Example 2

A tire was obtained in the same manner as in example 1 except that turnup ends of a first carcass ply were located outwardly of a second carcass ply in the axial direction, and a ratio AW/BW was as indicated in table 1.

Comparative Example 3 and Comparative Example 4

Tires were each obtained in the same manner as in example 1 except that a tip position of each apex and a ratio AW/BW were as indicated below in table 1.

Example 2 and Comparative Example 5

Tires were each obtained in the same manner as in example 1 except that a ratio L1/LT and a ratio AW/BW were as indicated in table 2.

Example 3 to Example 7

Tires were each obtained in the same manner as in example 1 except that a ratio AW/BW was as indicated in table 2.

Example 8 to Example 11

Tires were each obtained in the same manner as in example 1 except that a rubber hardness of each apex was as indicated in table 3.

Comparative Example 6 to Comparative Example 8

Tires were each obtained in the same manner as in example 1 except that a ratio L2/LH, a ratio AW/BW, and a rubber hardness of each apex were as indicated in table 3.

[Evaluation by Actual Vehicle]

A commercially available two-wheeled automotive vehicle (four-cycle) having an engine displacement of 1000 cm$^3$ was prepared. Each of the sample tires was mounted to a front wheel of the two-wheeled automotive vehicle. A rim of MT3.50×17 was used. An internal air pressure of the tire was 250 kPa. A commercially available conventional tire was mounted to a rear wheel. An evaluation by an actual vehicle was made by using a circuit course of a dry asphalt road. Corner driving at a speed ranging from 100 km/h to 150 km/h, and straight driving at a speed ranging from 250 km/h to a vehicle maximum speed (about 280 km/h), were conducted. A sensory evaluation by a rider was made for each driving, with 5.0 being the best score. The greater the value of the score is, the more favorable the evaluation result is. The evaluation was made for cornering stability and shock absorbency. The results are indicated below in table 1 to table 3.

TABLE 1

Evaluation result

|  | Comparative example 1 | Comparative example 2 |
|---|---|---|
| First carcass turned-up portion | formed | formed |
| First carcass ply turnup position | B | B |
| Second carcass turned-up portion | formed | not formed |
| Ratio L1/LT | — | 0.1 |
| Ratio L2/LH | — | 0.4 |
| Apex tip position | B | A |
| Ratio AW/BW | 0.2 | 0.5 |
| Apex rubber hardness | 77 | 77 |
| Cornering Stability | 3.5 | 3.5 |
| Shock absorbency | 3.0 | 3.0 |

|  | Example 1 | Comparative example 3 | Comparative example 4 |
|---|---|---|---|
| First carcass turned-up portion | formed | formed | formed |
| First carcass ply turnup position | A | A | A |
| Second carcass turned-up portion | not formed | not formed | not formed |
| Ratio L1/LT | 0.1 | 0.1 | 0.1 |
| Ratio L2/LH | 0.4 | 0.4 | 0.4 |
| Apex tip position | A | B | C |
| Ratio AW/BW | 0.6 | 0.2 | 0.5 |
| Apex rubber hardness | 77 | 77 | 77 |
| Cornering Stability | 4.5 | 3.5 | 3.7 |
| Shock absorbency | 4.5 | 3.5 | 3.5 |

TABLE 2

Evaluation result

|  | Comparative example 5 | Example 2 | Example 6 |
|---|---|---|---|
| First carcass turned-up portion | formed | formed | formed |
| First carcass ply turnup position | A | A | A |
| Second carcass turned-up portion | not formed | not formed | not formed |
| Ratio L1/LT | 0.3 | 0.2 | 0.1 |
| Ratio L2/LH | 0.4 | 0.4 | 0.4 |
| Apex tip position | A | A | A |
| Ratio AW/BW | 0.5 | 0.5 | 0.2 |
| Apex rubber hardness | 77 | 77 | 77 |
| Cornering stability | 4.0 | 4.0 | 3.7 |
| Shock absorbency | 3.3 | 4.5 | 3.7 |

|  | Example 4 | Example 3 | Example 5 | Example 7 |
|---|---|---|---|---|
| First carcass turned-up portion | formed | formed | formed | formed |
| First carcass ply turnup position | A | A | A | A |
| Second carcass turned-up portion | not formed | not formed | not formed | not formed |
| Ratio L1/LT | 0.1 | 0.1 | 0.1 | 0.1 |
| Ratio L2/LH | 0.4 | 0.4 | 0.4 | 0.4 |
| Apex tip position | A | A | A | A |
| Ratio AW/BW | 0.3 | 0.5 | 0.7 | 0.8 |
| Apex rubber hardness | 77 | 77 | 77 | 77 |
| Cornering stability | 3.8 | 4.0 | 3.9 | 3.7 |
| Shock absorbency | 4.0 | 4.5 | 4.2 | 4.0 |

TABLE 3

Evaluation result

|  | Example 10 | Example 8 | Example 9 | Example 11 |
|---|---|---|---|---|
| First carcass turned-up portion | formed | formed | formed | formed |
| First carcass ply turnup position | A | A | A | A |
| Second carcass turned-up portion | not formed | not formed | not formed | not formed |
| Ratio L1/LT | 0.1 | 0.1 | 0.1 | 0.1 |
| Ratio L2/LH | 0.4 | 0.4 | 0.4 | 0.4 |
| Apex tip position | A | A | A | A |
| Ratio AW/BW | 0.6 | 0.6 | 0.6 | 0.6 |
| Apex rubber hardness | 65 | 70 | 85 | 90 |
| Cornering stability | 3.8 | 4.0 | 4.1 | 4.2 |
| Shock absorbency | 3.8 | 4.2 | 4.0 | 3.3 |

|  | Comparative example 6 | Comparative example 7 | Comparative example 8 |
|---|---|---|---|
| First carcass turned-up portion | formed | formed | formed |
| First carcass ply turnup position | A | A | A |
| Second carcass turned-up portion | not formed | not formed | not formed |
| Ratio L1/LT | 0.1 | 0.1 | 0.1 |
| Ratio L2/LH | 0.6 | 0.6 | 0.6 |
| Apex tip position | A | A | A |
| Ratio AW/BW | 0.5 | 0.5 | 0.5 |
| Apex rubber hardness | 65 | 77 | 90 |
| Cornering stability | 3.5 | 3.7 | 3.0 |
| Shock absorbency | 3.5 | 3.8 | 3.0 |

As indicated in table 1 to table 3, it was confirmed that the tires of examples were excellent in cornering stability and shock absorbency. The evaluation results clearly indicate that the present invention is superior.

The pneumatic tire for use in two-wheeled automotive vehicles according to the present invention can be mounted to various vehicles.

The foregoing description is in all aspects illustrative, and various modifications can be devised without departing from the essential features of the invention.

What is claimed is:

1. A pneumatic tire for use in a two-wheeled automotive vehicle, comprising:
   a tread;
   a pair of sidewalls extending approximately inward from ends, respectively, of the tread in a radial direction;
   a pair of beads extending approximately inward from the pair of sidewalls, respectively, in the radial direction, each of the pair of beads including a core, and an apex extending from an outside surface of the core outward in the radial direction, the apex being integrally formed of one kind of crosslinked rubber;
   a carcass extending on and between the beads under and along the tread and the pair of sidewalls; and
   a band located inwardly of the tread in the radial direction and layered over the carcass under the tread,
   wherein
   the band includes a cord and a topping rubber,
   the cord is helically wound in a tire circumferential direction, and an absolute value of an angle of the cord to an equator plane is less than or equal to five degrees,
   the carcass includes a first carcass ply, and a second carcass ply that is layered over the first carcass ply, so as to be located outwardly of the first carcass ply in the radial direction, the first carcass ply includes a first carcass cord and a topping rubber, and an absolute value of a tilt angle of the first carcass cord relative to the tire circumferential direction is greater than or equal to 60 degrees, and is not greater than 90 degrees, the second carcass ply includes a second carcass cord and a topping rubber, and an absolute value of a tilt angle of the second carcass cord relative to the tire circumferential direction is greater than or equal to 60 degrees, and is not greater than 90 degrees, the first carcass ply is turned up around the pair of beads, the first carcass ply includes turned-up portions extending approximately outward in the radial direction, and turnup ends located at radially outermost ends of the turned-up portions, respectively, the second carcass ply includes inner ends at radially innermost ends thereof, the turnup ends are located inwardly of the second carcass ply in an axial direction, when a point that is on a tread surface, and is distant from a corresponding one of the ends of the tread by a quarter of a half width LT of a width of the tread surface in the axial direction, is represented as a point PA, a midpoint of a straight line LH connecting between the one of the ends of the tread, and a heel of a corresponding one of the beads, is represented as a point PB, a point, on a tire outer surface, corresponding to a corresponding one of the turnup ends is represented as a point P1, and a point, on the tire outer surface, corresponding to a corresponding one of the inner ends is represented as a point P2, the point P1 is located inwardly of the point PA in the radial direction, the point P2 is located outwardly of the point PB in the radial direction, a tip of the apex is located inwardly, in the radial direction, of a corresponding one of the ends of the tread, and outwardly, in the radial direction, of a position that is distant from the one of the ends of the tread in the radially inward direction by one-third of a length of the straight line LH, the tip of the apex is located outwardly of the point P2 in the radial direction, and a ratio AW/BW of a thickness AW of the apex at the point PB relative to a width BW of each bead, is greater than or equal to 0.3, and is not greater than 0.7.

2. The pneumatic tire according to claim 1, wherein a hardness of a crosslinked rubber of the apex is greater than or equal to 70, and is not greater than 85.

* * * * *